Aug. 15, 1967 J. O. CLOYD 3,336,067
FISHING ACCESSORY
Filed June 27, 1966
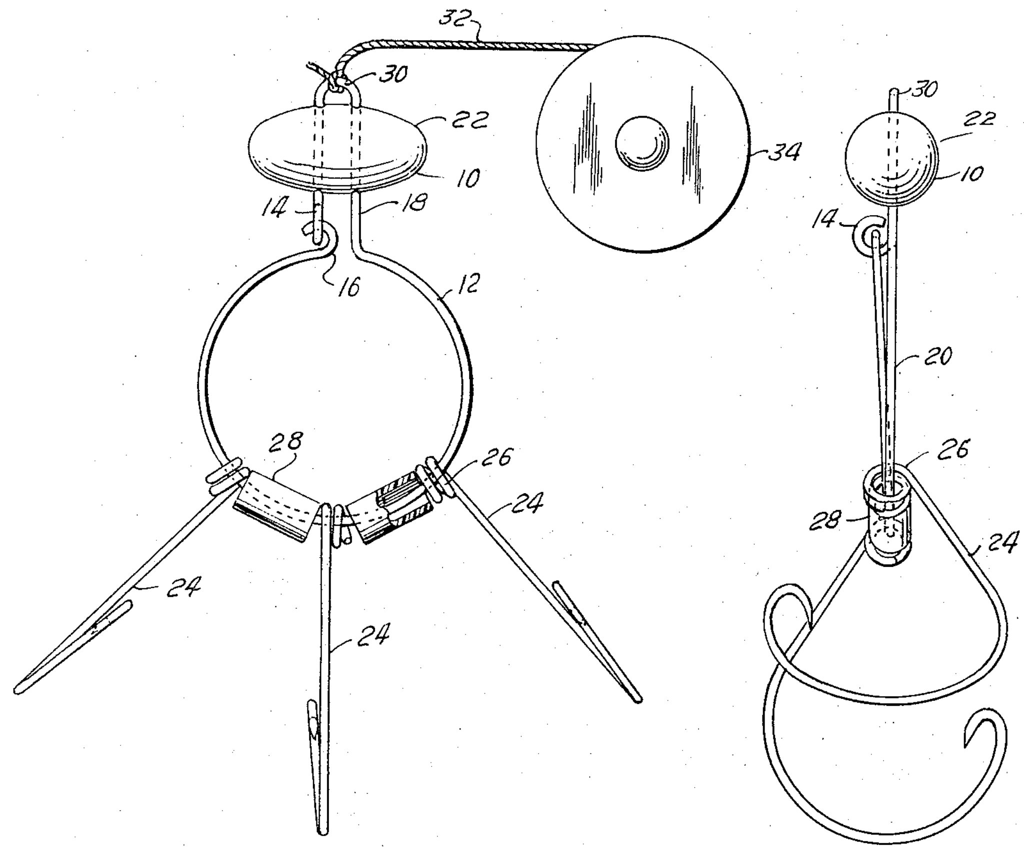
Fig. 1
Fig. 2
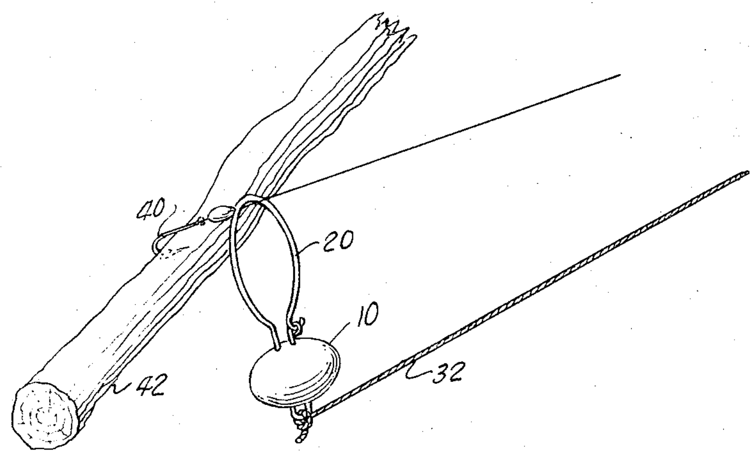
Fig. 3
INVENTOR
Joseph O. Cloyd
BY [signature] ATTORNEY 3,336,067
Patented Aug. 15, 1967

3,336,067

FISHING ACCESSORY

Joseph Oral Cloyd, 6921 Forest Park Road, Dallas, Tex. 75235

Filed June 27, 1966, Ser. No. 560,602
1 Claim. (Cl. 294—66)

This application is a continuation-in-part of my application, Ser. No. 388,390 filed Aug. 10, 1964, entitled, Fishing Accessory, now abandoned.

The present invention relates to fishing accessories of the type especially adapted for releasing or dislodging fish hooks or hook equipped fishing plugs from submerged obstructions and which is also adaptable for use as a grapple to recover objects which may be desired to be recovered from the water.

It is common in the art to provide a weighted body adapted to be detachably slidably mounted onto a snagged fishing line for the purpose of disengaging snagged hooks or lures. It is also common practice to provide a retrieving line which is attached to the weighted body for retrieving the same after it has knocked the hook loose in the event it should fall from the fishing line.

The present invention provides an improved form of fishing accessory useful for dislodging hooks which is also capable of being equipped with grappling hooks to form a grapple that can be used for the recovery of fishing tackle and other objects that may fall from the bank or a boat such as an outboard motor or even a human. In practice of the present invention, one end of a length of resilient wire material is shaped to define an eye, the other end being shaped to define a hook engagable with the eye. The wire is bent to form a U-shaped bight portion and a loop which terminates in a hook shaped end. The weight, suitably of lead, is molded onto the U-shaped bight portion with sufficient space provided between the molded portion and the base of the U-shaped bight portion to define an eye to which a retrieving line may be attached. When the hook is disengaged from the eye, a fishing line may be received within the enlarged loop portion if the device is to be utilized for release of a snagged hook or the grappling hooks may be placed onto the loop portion of the wire by sliding them over the end shaped to define a hook. The enlarged loop portion is made sufficiently large that the device can be utilized with long fishing poles, in which access cannot be had to the fishing line, by the expedient of slipping the butt end of the fishing pole through the loop and tilting the pole to permit the device to slide down the pole onto the line. The enlarged loop must therefore be sufficiently large to receive and pass over the butt end of a fishing pole and also large enough for attachment of the grappling hooks.

Many objects and advantages of the invention will become apparent to those skilled in the art as the following detailed description of a preferred embodiment of the same unfolds when taken in conjunction with the appended drawings wherein like reference numerals denote like parts and in which:

FIGURE 1 is a front elevational view of a fishing accessory in accordance with the present invention;

FIGURE 2 is a perspective view of the device of FIGURE 1; and

FIGURE 3 is a perspective view illustrating the operation of the device.

Turning now to the drawings, the device in accordance with the present invention is designated by the reference character 10. It can be seen to comprise a length of wire 12, which is shaped at one end to define an eye 14 and its other end to define a hook 16. The portion of the wire 12, adjacent the hook eye 14, is shaped to define a U-shaped bight portion 18 and the remainder of the length of wire terminating in the hook 16 is shaped to form annular loop 20. The annular loop 20 is suitably in the order of two to four inches in diameter. It can be seen that when the hook 16 engages the eye 14, the loop portion 20 will be closed. There is also provided a weight 22 which is connected to and encloses an intermediate portion of the bight portion 18. The weight 22 is suitably of lead, molded in a generally egg shaped configuration, to minimize the possibility of the weight becoming entangled.

There is also provided a plurality of hook members 24, which are also suitably formed of wire. The hook members include a shank that is terminated at one end in a coil 26 having at least two turns. The diameter of the coil 26 is such that hook members 20 may be passed over the hook 16 defined by the wire 12 onto a portion of the wire which forms the annular loop 20. It is desirable that the coil portion 26 of the hooks 24 each include at least two turns for the purpose of maintaining the hooks in a plane substantially normal to the plane of the annular loop 20. Tubular spacers 28 are provided between the hooks 24 for separating the hooks to prevent them from becoming entangled. It can be seen that adjacent ones to the hooks 24 when placed on the loop 20 suitably face in opposite directions.

It can be seen at the closed end 30 of the bight portion 18 extending from the weight 22, defines an eye to which a safety line 32 can be attached. The safety line 32 is suitably carried on a reel 34. Safety line 32 is suitably of strong material capable of withstanding a substantial amount of strain for reasons that become apparent as description of the operation of the device of the present invention continues.

If the device is to be utilized for releasing a hook or lure from an obstruction such as weeds, sunken tree limbs, stumps, etc., the hooks 24 and spacers 28 are removed from the annular loop 20. If a rod and reel are used, it will, of course, be a simple matter to disengage the hook 16 from the eye 14, permitting the line to which the lure is attached to be passed into the loop portion 20 and thereafter engage the hook 16 with the eye 14 for closing the loop 20. The device can then be permitted to slide down the line until the hook is reached. As the weight and the eye strike the hook or lure, it will dislodge the barb of the hook from the obstruction and carry the hook away from the obstruction. The lure can then be retrieved, using the rod and reel, and the device 10 retrieved using the safety line 32.

If the hook 40 which is desired to be dislodged is entangled with an obstruction 42 with the hook positioned on the opposite side of the obstruction from the operator, as the device 10 slides down the line it will stop when it reaches the obstruction without engaging the hook, as shown in FIGURE 3. It will be noted, however, that the eye formed by the closed end 30 of the bight portion 18 will be the lowermost portion of the device, since the weight 22 is positioned below the closed loop 20. By jerking the safety line 32, the device 10 can be caused to flip over the obstruction and into a position engaging the hook 40 to release it from the obstruction.

Also, as mentioned previously, many fishermen utilize a long pole which may be twelve to twenty feet long with a fishing line attached to one end thereof. If the fishing hook attached to the end of this line becomes entangled with some obstruction, access cannot normally be had to the line for purposes of attaching conventional types of fish hook releases to the line. However, in accordance with the present invention, the annular loop 20 is suitably in the order of 2 to 4 inches in diameter such that the closed loop 20 can be slipped over the butt end of the fishing pole. When the fishing pole is held in such a position that the tip thereof slants downward, the weight will slide down the pole onto the line, and thereafter slide down the fishing line for purposes of striking the hook to release it from the obstruction.

When the grappling hook 24 and spacers 28 are placed onto the annular loop 20, the accessory can be used for retrieval of items lost in the water, such as rods and reels, fish baskets, outboard motors, and also to retrieve drowning persons. For this reason it is desired that the safety line 32 be of size and material such that it can withstand substantial stresses. It will be noted that it is important that the shanks of the grappling hooks 24 be terminated in the coil for purposes of maintaining the hooks 24 in a plane substantially normal to the plane of the loop 20. Further, since adjacent ones of the grappling hooks 24 face in opposite directions, assurance is thereby provided that at least one of the grappling hooks will engage any object across which the device 10 may pass.

Although the invention has been described with reference to a particular preferred embodiment thereof, many changes and modifications will become apparent to those skilled in the art in view of the foregoing description which is intended to be illustrative and not limiting of the invention defined in the appended claim.

What I claim is:

A fishing accessory comprising a length of wire shaped to define a U-shaped bight portion and an annular loop portion, one end of said wire being shaped to define an eye and the other end thereof being shaped to define a hook engageable with said eye for closing said loop portion, a weight connected to and enclosing an intermediate portion of said bight portion with a closed end of said bight portion extending from the body of said weight to form an eye for receiving a safety line, a plurality of grappling hook members having a shank terminated in a coil having at least two turns through which said first mentioned hook passes for supporting said grappling hook members on said looped portion, and a plurality of tubular spacers on said loop portion for separating said hook members.

References Cited

UNITED STATES PATENTS

| | | | |
|---|---|---|---|
| 1,988,160 | 1/1935 | Butte | 43—17.2 |
| 2,210,271 | 8/1940 | Thwaits | 43—5 |
| 2,235,371 | 3/1941 | Jyrkas | 43—5 |

FOREIGN PATENTS

| | | |
|---|---|---|
| 899,445 | 8/1944 | France. |

SAMUEL KOREN, *Primary Examiner.*

D. J. LEACH, *Assistant Examiner.*